(12) United States Patent
Schüssler

(10) Patent No.: US 10,300,792 B2
(45) Date of Patent: May 28, 2019

(54) DEVICE FOR A MOTOR VEHICLE

(71) Applicant: AUDI AG, Ingolstadt (DE)

(72) Inventor: Martin Schüssler, Kösching (DE)

(73) Assignee: AUDI AG, Ingolstadt (DE)

( * ) Notice: Subject to any disclaimer, the term of this patent is extended or adjusted under 35 U.S.C. 154(b) by 233 days.

(21) Appl. No.: 15/623,806

(22) Filed: Jun. 15, 2017

(65) Prior Publication Data

US 2017/0361714 A1 Dec. 21, 2017

(30) Foreign Application Priority Data

Jun. 15, 2016 (DE) .................... 10 2016 007 256

(51) Int. Cl.
*B60L 3/04* (2006.01)
*B60L 3/12* (2006.01)
*B60L 50/64* (2019.01)
*B60R 16/03* (2006.01)
*B60R 21/0134* (2006.01)

(52) U.S. Cl.
CPC .............. *B60L 3/12* (2013.01); *B60L 3/04* (2013.01); *B60L 50/64* (2019.02); *B60R 16/03* (2013.01); *B60R 2021/01345* (2013.01); *B60Y 2200/91* (2013.01); *Y02T 10/705* (2013.01); *Y02T 10/7005* (2013.01)

(58) Field of Classification Search
CPC ........ B60L 3/12; B60L 50/64; B60Y 2200/91; B60R 2021/01345; B60R 16/03; Y02T 10/7005; Y02T 10/705
See application file for complete search history.

(56) References Cited

U.S. PATENT DOCUMENTS

| | | | | |
|---|---|---|---|---|
| 3,783,211 A | * | 1/1974 | Panettieri ............... | H01H 35/14 200/61.5 |
| 4,321,438 A | * | 3/1982 | Emenegger ............ | H01H 35/14 200/61.45 R |
| 5,535,842 A | * | 7/1996 | Richter .................. | B60K 28/14 180/271 |
| 2012/0276422 A1 | * | 11/2012 | Deyda .................. | H01H 39/006 429/50 |

FOREIGN PATENT DOCUMENTS

| | | |
|---|---|---|
| CN | 202806406 U | 3/2013 |
| DE | 7905331 U1 | 6/1979 |
| DE | 4306488 A1 | 9/1994 |

(Continued)

OTHER PUBLICATIONS

Examination Report dated Nov. 3, 2016 of corresponding German application No. 102016007256.3; 10 pgs.

(Continued)

*Primary Examiner* — Jared Fureman
*Assistant Examiner* — Duc M Pham
(74) *Attorney, Agent, or Firm* — Maier & Maier, PLLC

(57) ABSTRACT

A device for a motor vehicle, includes a housing, in which electrical components are arranged, which are supplied with electrical energy across at least one electrical power supply line, which is arranged inside the housing. The housing has at least one impact switch. In the event that a mechanical force acts on the at least one impact switch in excess of a threshold value, the housing is deformed at a position of the at least one impact switch.

9 Claims, 2 Drawing Sheets

(56) References Cited

FOREIGN PATENT DOCUMENTS

| | | |
|---|---|---|
| DE | 10260271 A1 | 7/2004 |
| DE | 102009050996 A1 | 5/2011 |
| DE | 102010051669 A1 | 5/2012 |
| DE | 10 2011 014343 A1 | 9/2012 |
| DE | 102014017990 A1 | 6/2015 |
| EP | 1 645 475 A1 | 4/2006 |

OTHER PUBLICATIONS

European Search Report dated Oct. 27, 2017 of corresponding European application No. 17171682.2; 5 pgs.

* cited by examiner

DEVICE FOR A MOTOR VEHICLE

FIELD

The invention relates to a device for a motor vehicle and a method for operating a device.

BACKGROUND

A motor vehicle which uses at least one electric engine for its propulsion comprises an electrical system with at least one control unit and at least one energy storage device, with which the at least one electric engine is controlled and supplied with electric energy. This electrical system has an electric voltage which is higher than the electric voltage of a typical battery of a motor vehicle. Furthermore, the electrical system of the motor vehicle is associated with a crash sensor or impact sensor, which recognizes an impact acting on the motor vehicle. If such an impact occurs, a signal is generated by the crash sensor and provided by a line to the electrical system. Upon receiving such a signal, it is possible to switch the electrical system off, at least partially. However, the danger exists here that mechanical effects of the impact are already acting on the electrical system before the signal documenting the impact has reached the electrical system, so that not enough time remains to take any safety measures which may have been provided for the electrical system, typically by switching off the system.

From the publication CN 202806406 U there is known an accident safety system for an electrically propelled motor vehicle with a high-voltage on-board network, wherein an inertia switch is associated with this high-voltage on-board network, which, in the event of an accident, severs a battery from a consumer as components of the high-voltage on-board network.

A mechanical crash switch that automatically severs a battery of a motor vehicle from a consumer in the event of an accident is known from the publication DE 79 05 331 U1.

A trigger system for an airbag of a motor vehicle is described in the publication DE 43 06 488 A1, wherein the trigger system comprises an electromechanical crash switch, which automatically triggers safety elements in the motor vehicle upon an accident.

From the publication DE 102 60 271 A1, a device is known for the triggering of an electrical safety feature in a power supply circuit of a consumer arranged in a motor vehicle, wherein an electrical conductor connected to ground and a plus conductor of the power supply circuit in the motor vehicle are arranged so that both conductors are short-circuited through low resistance due to any force acting during an accident.

From the publication DE 10 2014 017 990 A1, a high-voltage component is known for a motor vehicle, especially a hybrid or electric vehicle, having a sensor mechanism by means of which any mechanical damage to the high-voltage component can be recognized, wherein the sensor mechanism comprises at least a chamber and at least a pressure sensor, by means of which a change in the gas pressure prevailing in the chamber brought about by mechanical damage to the high-voltage component can be detected.

The publication DE 10 2010 051 669 A1 discloses an electrical component with a mechanism for severing an electric power supply connection, having a reactive multi-layer structure to bring about the severing of the electric power supply connection. The electrical component may be a galvanic cell, and the severing mechanism may be arranged outside or inside the cell.

From the publication DE 10 2009 050 996 A1 an energy storage means is known, especially for vehicles, with at least two energy sources, which are joined across an electrical connection, and at least one safety element, wherein the safety element is deformable and/or expandable in order to break the electrical connection between the energy sources. Moreover, a method is disclosed for the breaking of electrical connections of an energy storage means with at least two energy sources.

SUMMARY OF THE DISCLOSURE

Against this background, a device and a method are proposed with the features of the independent patent claims. Embodiments of the device and the method will emerge from the dependent patent claims and the description.

The electrical device according to the invention, which is intended for a motor vehicle, comprises a housing, in which electrical components are arranged, which are to be supplied with electric energy across at least one electrical power supply line, which is arranged inside the housing. The housing comprises at least one impact switch. If any mechanical force acts on the at least one impact switch in excess of a threshold value, the housing is deformed at a position of the at least one impact switch, whereupon the at least one electrical power supply line inside the housing is severed due to a deformation of the housing at the position of the at least one impact switch and any force resulting therefrom.

In one embodiment, the at least one impact switch of the housing is designed as a predetermined breaking point.

The at least one power supply line has at least one predetermined breaking point, which is severed due to the deformation of the housing at the position of the at least one impact switch and the resulting force, whereupon the deformation of the housing acts on the predetermined breaking point of the power supply line.

Furthermore, it is possible for at least one component to be arranged in the housing of the device, which connects the position of the housing where the at least one impact switch is arranged and the at least one electrical power supply line. The at least one component is designed to transmit the force resulting from the deformation of the housing at the position of the at least one impact switch to the at least one power supply line.

In one embodiment, the at least one predetermined breaking point of the at least one power supply line is connected by the at least one component to the at least one impact switch, wherein the at least one component is designed to transmit the force resulting from the deformation of the housing at the position of the at least one impact switch to the at least one predetermined breaking point of the at least one power supply line.

In another embodiment, the housing of the device is deformed due to the acting force, whereupon the device still remains closed.

Moreover, electrical and/or mechanical components of an electric engine for the propulsion of the motor vehicle are arranged in the housing of the device.

Electrical and/or electronic components of the device form a power electronics, for example, for the electric engine for the propulsion of the motor vehicle.

Alternatively or in addition, it is possible for the power supply line to be arranged on an inner wall of the housing and thus touch the housing. It is possible for the at least one impact switch to be connected to the power supply line. If, due to an impact, the housing is deformed at the position of the at least one impact switch, such a deformation acts directly on the power supply line, whereupon the power supply line is directly interrupted or severed by the impact switch and/or the deformed housing.

In the method according to the invention for the operation of device of a motor vehicle it is provided that the device comprises a housing, in which electrical components are arranged, which are supplied with electric energy across at least one electrical power supply line, which is arranged inside the housing. The housing comprises at least one impact switch. If any mechanical force acts on the at least one impact switch in excess of a threshold value, the housing is deformed at a position of the at least one impact switch, whereupon the at least one electrical power supply line inside the housing is severed due to a deformation of the housing at the position of the at least one impact switch and any force resulting therefrom.

It is possible for the at least one power supply line, or its at least one predetermined breaking point, to be acted upon and severed by the at least one impact switch and/or the deformed housing directly or indirectly, usually by the at least one component arranged in the housing.

Thus, the device or the housing of the device comprises at least one mechanical impact switch or crash switch, with which the power supply line inside the housing of the device is mechanically affected. Thus, in the event of an impact and/or accident of the motor vehicle, the time for severing and thus interrupting the power supply line is reduced, so that the device can also be positioned in different positions of the motor vehicle independently from a provision of signals of a crash sensors. The device is usually designed as a component of a high-voltage system of the motor vehicle, wherein a power electronics for an electric engine for the propulsion of the motor vehicle is usually arranged in the device. The mechanical impact switch is then integrated in the housing of this device, so that an otherwise customary acceleration sensor for detecting an impact can be omitted.

With the impact switch acting mechanically on the power supply line, the components of the device and/or the entire device are mechanically severed from an electrical power supply. Usually the power supply line inside the housing of the device is connected by an electrical interface to an electrical energy storage device or an electrical energy source outside the device. By the electrical energy storage device or the electrical energy source, a high voltage of at least 40 V, for example, which is higher than the otherwise usual voltage of a battery of the motor vehicle, is to be supplied with electric energy.

In the event of an impact or accident, if any mechanical force greater than the predetermined threshold value acts on the at least one mechanical impact switch, the components inside the housing of the device are automatically severed from the external electrical energy storage device upon interruption of the power supply line inside the housing, which interrupts a power supply for the components. Since the electrical power supply line is severed within the housing, which is only deformed at the at least one impact switch yet remains closed, any resulting arcing and/or short circuit is confined to an interior space within the housing, so that the surroundings outside the housing are not negatively affected.

Since the device having the at least one impact switch in its housing has at least its own electromechanical safety feature, its power supply line can be severed regardless of any signals generated outside the device in the event of an impact, so that the device can now also be arranged at any given position inside the motor vehicle.

In one possible embodiment of the device and/or the method, it is provided that any force occurring during an impact or accident acts within a fraction of a second on the housing of the device, whereby the housing is deformed at the at least one crash switch, which is designed, for example, as a predetermined breaking point, while the housing may be thin and/or soft in the region of the at least one impact switch. Thanks to the deformation of the housing at the position of the at least one impact switch, the electrical power supply line configured as a current bus bar for example is likewise acted upon and thereby severed. It is possible for the electrical power supply line and/or the at least one predetermined breaking point of the electrical power supply line to be arranged directly behind the at least one impact switch, for example, on an inner wall of the device.

By severing the power supply line at the at least one predetermined breaking point, a supply of current and/or voltage to components inside the housing of the device is deliberately interrupted. Any arcing which might occur upon severing of the power supply line is confined to the interior of the housing. Alternatively or in addition, it is possible for the power supply line to be acted upon mechanically by at least one component inside the housing during a deformation of the housing at the position of the at least one impact switch, the power supply line, and/or the at least one predetermined breaking point of the power supply line being connected across the at least one component to the at least one impact switch in the housing of the device.

Further advantages and embodiments of the invention will emerge from the description and the appended drawings.

It is understood that the above-mentioned features and those yet to be explained can be used not only in the particular combination indicated, but also in other combinations or standing alone, without leaving the scope of the present invention.

BRIEF DESCRIPTION OF THE DRAWINGS

The invention is represented schematically with the aid of exemplary embodiments in the drawings and shall be described schematically and at length making reference to the drawings.

The figures are described in coherent and comprehensive manner, the same components being assigned the same reference numbers.

DETAILED DESCRIPTION

Figure 1:
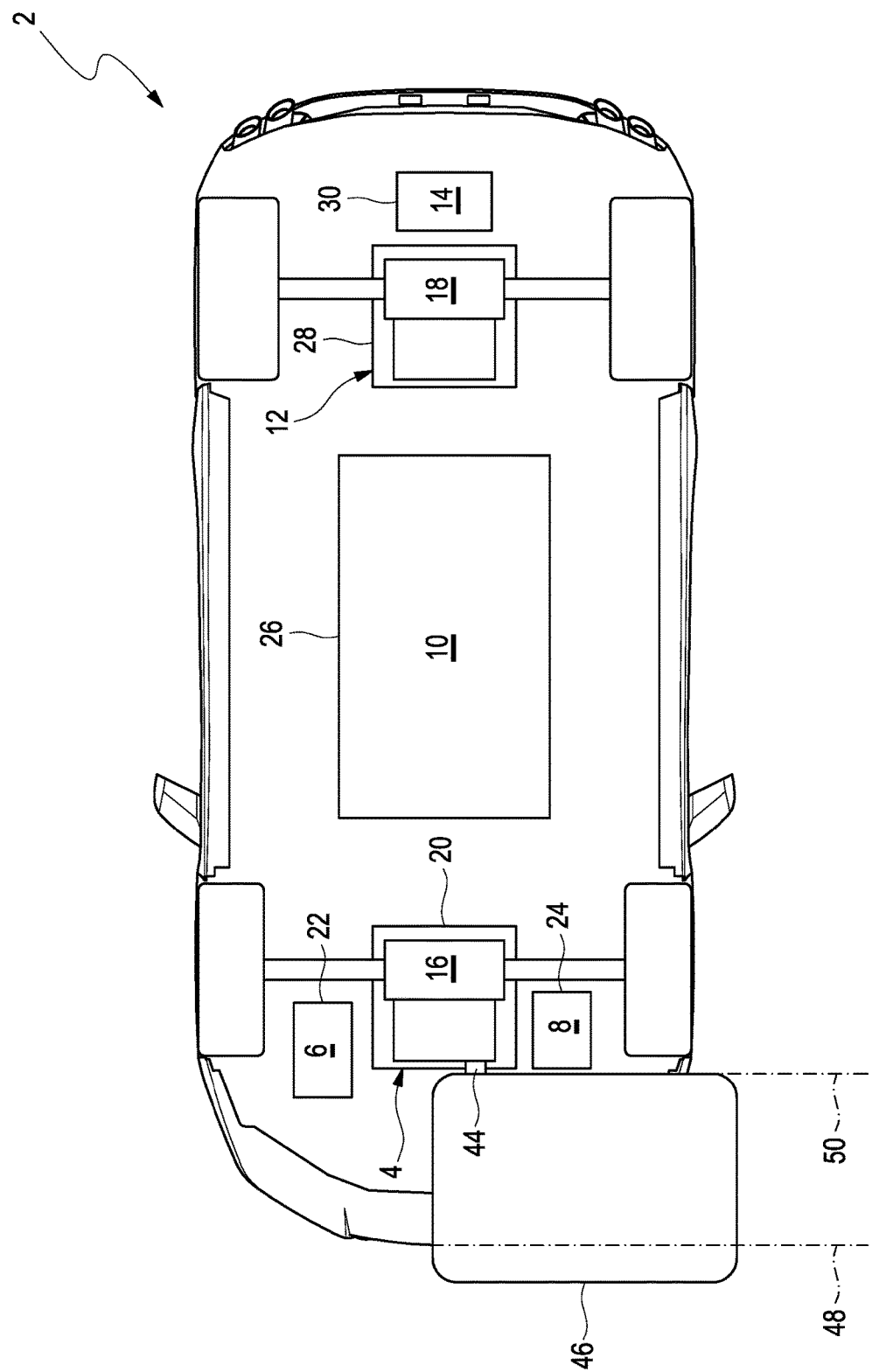
FIG. 1 shows in schematic representation a motor vehicle, having at least a first embodiment of the device according to the invention.

FIG. 1 shows in schematic representation a motor vehicle 2, having a plurality of electrical devices 4, 6, 8, 10, 12, 14. A first electrical device 4 is designed as a power electronics for a first electric motor 16 for driving a front axle of the motor vehicle 2, a second electrical device 6 as a high-voltage heating device, a third electrical device 8 as an air conditioning compressor, a fourth electrical device 10 as an electric energy source, here a high-voltage battery, a fifth electrical device 12 as a power electronics for a second electric engine 18 for driving a rear axle of the motor vehicle 2 and a sixth electrical device 14 as a second energy storage device, here a low-voltage battery of 12 V.

Figure 2A:
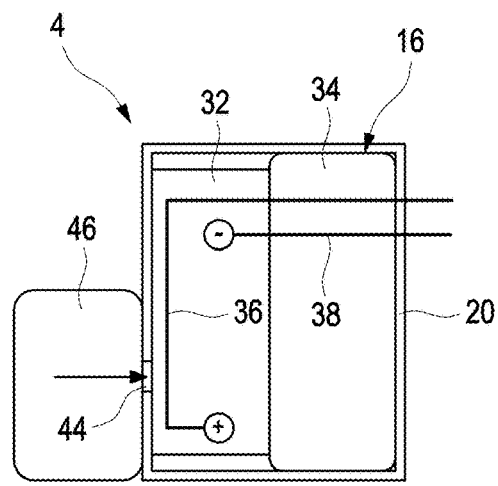
FIG. 2A shows in schematic representation the at least one first variant of the embodiment of the device according to the invention from FIG. 1 in a first operational situation.
Figure 2B:
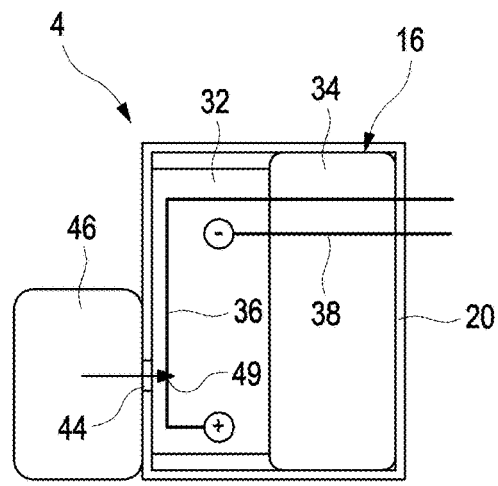
FIG. 2B shows in schematic representation the at least one first variant of the embodiment of the device according to the invention from FIG. 1 in a second operational situation.
Figure 3:
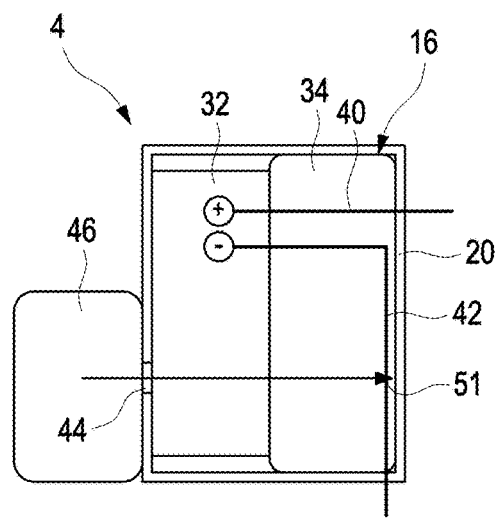
FIG. 3 shows in schematic representation a second variant of the embodiment of the device according to the invention.

Details on one of these electrical devices 4, 6, 8, 10, 12, 14 are shown explicitly in FIGS. 2 and 3 with the aid of the device 4 designed as the first power electronics.

It is provided here that at least one of the mentioned devices 4, 6, 8, 10, 12, 14 comprises a housing 20, 22, 24, 26, 28, 30, in which electrical components 32, 34 of the respective device 4, 6, 8, 10, 12, 14 are arranged, these components 32, 34 being supplied with electric energy by at least one electrical power supply line 36, 38, 40, 42, this at least one power supply line 36, 38, 40, 42 being arranged inside the housing 20, 22, 24, 26, 28, 30 and usually connected by an interface in the housing 20, 22, 24, 26, 28, 30 to an external energy source for the supply of electric energy.

Furthermore, the housing 20, 22, 24, 26, 28, 30 comprises at least one mechanical impact switch 44. If a mechanical force in excess of a threshold value acts on this at least one impact switch 44 due to an impact and/or accident, the housing 20, 22, 24, 26, 28, 30 will be mechanically deformed at a position of the at least one impact switch 44, while the at least one electrical power supply line 36, 38, 40, 42 within the housing 20, 22, 24, 26, 28, 30 is or will be severed due to a deformation of the housing 20, 22, 24, 26, 28, 30 at the position of the at least one impact switch 44 and any force resulting therefrom, and accordingly is or will be interrupted.

For this, a mechanical action of the impact is symbolized in FIGS. 1, 2 and 3 by a so-called impact barrier 46 or crash barrier. FIG. 1 furthermore includes a first time line 48 and a second time line 50, which show the position of the motor vehicle 2 where the impact is acting as a function of time. The first time line 48 here occurs at a time t=0, when the impact begins, the impact still being confined to an outer wall of the motor vehicle 2. The second time line 50 occurs after a period of t=50 ms after the impact and shows that the impact is already acting on the housing 20 of the first device 4.

Moreover, the first electric engine 16 is also arranged in the housing 20 of the first device 4. The second electric engine 18 is also arranged inside the housing 28 of the second electrical device 12. Depending on definition, the electric engines 16, 18 are likewise designed and/or designated as electrical devices.

As FIG. 2a shows, in a first embodiment of the method, the impact switch 44 in the housing 20 of the device 4 is acted upon by the impact, while the housing 20 is deformed at a position of the impact switch 44. As a result, as FIG. 2b shows, the power supply line 36 connected here to the housing 20 is severed at a predetermined breaking point 49.

In the second variant of the device 4 (FIG. 3), the impact switch 44 in the housing 20 is likewise mechanically acted upon due to the impact and the housing 20 is deformed at the position of the impact switch 44. It is provided here that the deformation acts indirectly through components 32, 34 inside the housing 20 on the power supply line 42, whereupon the power supply line 42 is interrupted and thus severed at the position of a predetermined breaking point 51.

The invention claimed is:

1. A device for a motor vehicle, comprising:
a housing, in which electrical components are arranged, which are supplied with electrical energy across at least one electrical power supply line, which is arranged inside the housing, wherein the housing comprises at least one impact switch, wherein, in the event that a mechanical force acts on the at least one impact switch in excess of a threshold value, the housing is deformed at a position of the at least one impact switch, wherein the at least one electrical power supply line within the housing is severed due to a deformation of the housing at the position of the at least one impact switch and any force resulting therefrom.

2. The device according to claim 1, wherein the at least one impact switch of the housing is designed as a predetermined breaking point.

3. The device according to claim 1, wherein the at least one power supply line has at least one predetermined breaking point, which is severed due to the deformation of the housing at the position of the at least one impact switch and the force resulting therefrom.

4. The device according to claim 1, wherein the at least one power supply line is arranged on an inner wall of the housing and is connected to the at least one impact switch.

5. The device according to claim 1, wherein at least one component is arranged in the housing, which connects the position of the housing where the at least one impact switch is arranged and the at least one electrical power supply line, wherein the at least one component is designed to transmit the force resulting from the deformation of the housing at the position of the at least one impact switch to the at least one power supply line.

6. The device according to claim 1, wherein the housing is deformed due to the acting force and remains closed.

7. The device according to claim 1, wherein electrical and/or mechanical components of an electric engine for propelling the motor vehicle are arranged in the housing.

8. The device according to claim 1, wherein the electrical components form a power electronics.

9. A method for operating a device of a motor vehicle, wherein the device comprises a housing, in which electrical components are arranged, which are supplied with electrical energy across at least one electrical power supply line, which is arranged inside the housing, wherein the housing comprises at least one impact switch, wherein, in the event that a mechanical force acts on the at least one impact switch in excess of a threshold value, the housing is deformed at a position of the at least one impact switch, wherein the at least one electrical power supply line within the housing is severed due to a deformation of the housing at the position of the at least one impact switch and any force resulting therefrom.

\* \* \* \* \*